United States Patent [19]

Biba et al.

[11] 4,365,331
[45] Dec. 21, 1982

[54] MULTIPLE CHANNEL DATA COMMUNICATION SYSTEM

[75] Inventors: Kenneth J. Biba, San Francisco; Jose J. Picazo, Jr., San Jose, both of Calif.

[73] Assignee: Sytek Corporation, Sunnyvale, Calif.

[21] Appl. No.: 166,384

[22] Filed: Jul. 7, 1980

[51] Int. Cl.³ .............................................. H04J 1/10
[52] U.S. Cl. ................................. 370/124; 340/825.5
[58] Field of Search .................. 370/69, 71, 72, 73, 370/57, 85, 94, 60, 86, 89, 124; 340/147 LP, 825.5, 825.51

[56] References Cited

U.S. PATENT DOCUMENTS

| | | | |
|---|---|---|---|
| 2,932,694 | 4/1960 | Hawks et al. | 370/71 |
| 3,548,106 | 12/1970 | Watson et al. | 370/71 |
| 3,864,521 | 2/1975 | De Long et al. | 370/71 |
| 4,031,327 | 6/1977 | Butin et al. | 370/71 |
| 4,154,983 | 5/1979 | Pedersen | 370/89 |

OTHER PUBLICATIONS

IBM Technical Disclosure Bulletin, "Frequency Allocation for Freq. Div. Communication" by Foglia et al., vol. 21, No. 10, Mar. 1979, pp. 4139–4141.

Primary Examiner—Douglas W. Olms
Attorney, Agent, or Firm—Thomas E. Schatzel

[57] ABSTRACT

A multiple channel communications system and method for communication among multiple channels using a channel selectable MODEM. The system is comprised of a coaxial cable, a variety of interface units with attached communicating devices and a channel bridge. The interface units include a MODEM and a microprocessor based support element adapted for the attached communicating device. The channel bridge includes two or more MODEM's and a microprocessor based computer for receiving data from one MODEM and transmitting the data on another MODEM.

13 Claims, 12 Drawing Figures

Fig_1

Fig_3

Fig-7

Fig_8

Fig_8C

Fig_8B

Fig_8A

MULTIPLE CHANNEL DATA COMMUNICATION SYSTEM

BACKGROUND OF THE INVENTION

1. Field of the Invention

The invention relates generally to data communication systems and more particularly to a data communication system for broadband coaxial cable which supports a plurality of communication channels.

2. Description of the Prior Art

Data communication is the transfer of digital information from one point to another, usually between a user terminal and a computer. In more sophisticated systems communication may take place between two computers, a computer and a remote printer or between combinations of computers, memory devices, terminals, or microprocessors used to control various devices, e.g. burglar alarms, to traffic controls, industrial operations, etc. Data is transmitted through a communication channel by a transceiver, sometimes referred to as a MODEM. Generally, the channel composes a pair of wires but can also assume other forms, e.g. radio frequency channels, microwave transmission channels, or optical fibers. In many applications a channel has a device at each end such as a computer connected to a terminal by a pair of wires. Data communication is also possible where there are more than two devices communicating on a channel.

When more than two using devices are connected to a single communication channel there are two methods of data communication. The first method is to assign time slots to the using devices connected to the channel. A using device may then transmit data during its time slot and must wait until the next cycle to transmit again. This method is known as "time division multiple access." The second method of communication allows any using device to transmit data when the communication channel is not being used by another device. This method of communication is referred to as "carrier sense multiple access (CSMA)."

A problem encountered with CSMA communication systems is that data collision occurs when two devices begin to transmit data at the same time. A signal sent by one transceiver will reach another transceiver a short time later, thus during the interim a second transceiver may begin transmitting a signal. The two signals will collide causing the data to be garbled.

Several methods have been developed for collision detection. One method, described in U.S. Pat. No. 4,063,220, granted to Metcalfe, et al., is to compare concurrently the cable contents bit by bit against the locally transmitted contents. If a difference is detected the transmission is aborted. Another method uses a looped cable where a signal is transmitted on an inbound cable and received on an outbound cable. A transceiver will receive its own transmission after the propagation delay of the cable. Once the entire transmission is received it is then compared to the transmitted signal to determine if the data has collided with another transmission. This method is inefficient in that a collision is not detected until th entire transmission is received.

When a collision has been detected by one of the above means the transceiver stops transmitting and backs off before retransmitting the same data. In order that both transceivers do not restart transmission at the same time the backoff time is determined either randomly or by a predetermined unique time interval.

In the prior art, data communication systems for coaxial cable have been limited to communication on a single channel. A channel is characterized by its position within the spectrum available (frequency) and the space it requires (bandwidth). Baseband coaxial cable has long been used for data communications. However, due to its physical characteristics only one communication channel is practical. Broadband (or CATV) coaxial cable has been used less frequently for data communication although it has long been used for cable television. The use of broadband coaxial cable for data communication is discussed in the article "Broadband Technology Magnifies Local Networking Capability" appearing in Data Communications, Vol. 9, No. 2, February, 1980. On broadband cable a broader frequency spectrum is available for transmission thus it is possible to divide the spectrum into frequency bandwidths which can be used for separate channels.

Information is communicated by a MODEM. MODEM's for use on broadband cable must be designed to transmit signals only in the frequencies of the channel to which it is assigned. Otherwise, it will cause interference on the other channels. Data is encoded by modulation which is accomplished by a variety of techniques. A problem encountered with modulation is that signals outside the bandwidth of the designated channel are generated. Therefore, it has been necessary to use filters. Filters add greatly to the expense of a transceiver and limit the transceivers operation to a designated channel. Thus, in the prior art, MODEM's for data communication over coaxial cable have been limited to operation on a single communication channel.

SUMMARY OF THE PRESENT INVENTION

It is therefore an object of the present invention to provide a data communication system with increased data communication capacity through use of multiple communication channels on a broadband coaxial cable.

It is a further object to provide a data communication system modem which is inexpensive and capable of programmable channel selection.

It is a further object to provide a data communication system with the capability of communication between communication channels on a cable.

It is a further object to provide a data communication system cable of operating on existing CATV coaxial cable installations.

It is a further objective to provide a data communication system with improved collision detection.

Briefly, in the preferred embodiment, a data communication system of the present invention includes a broadband coaxial cable which serves as the communication medium. Connected to the cable are a plurality of MODEM's which are channel selectable. Connected to the MODEM's are interfaces for controlling access to the cable and supply data to and receive data from a using device. Also included is a bridge between channels whereby a transmission on one channel may be rebroadcast on another channel.

An advantage of the data communication system of the present invention is that the data communication capacity for broadband coaxial cable is increased through the use of multiple communication channels.

Another advantage is that the MODEM may be produced at low cost and is capable of programmable channel selection.

A further advantage is the capability to communicate data between communication channels on a cable.

A further advantage is that the data communication system of the present invention may be installed on existing CATV coaxial cable networks thereby reducing the cost of installing a system.

A further advantage is that improved collision detection is provided.

These and other objects and advantages will no doubt become apparent to those skilled in the art after having read the following detailed description of the preferred embodiment which is illustrated in the several figures of the drawings.

IN THE DRAWINGS

FIG. 2 (comprising two sheets marked 2A and 2B) is a block diagram of an embodiment of a MODEM of the system of FIG. 1;

FIGS. 3(A–E) are waveform diagrams illustrating various input and output signals of a data decoder of the MODEM of FIG. 2;

FIG. 8(A–C) illustrate the contents of various fields of the data frame of FIG. 8.

DETAILED DESCRIPTION OF THE PREFERRED EMBODIMENT

Figure 1:
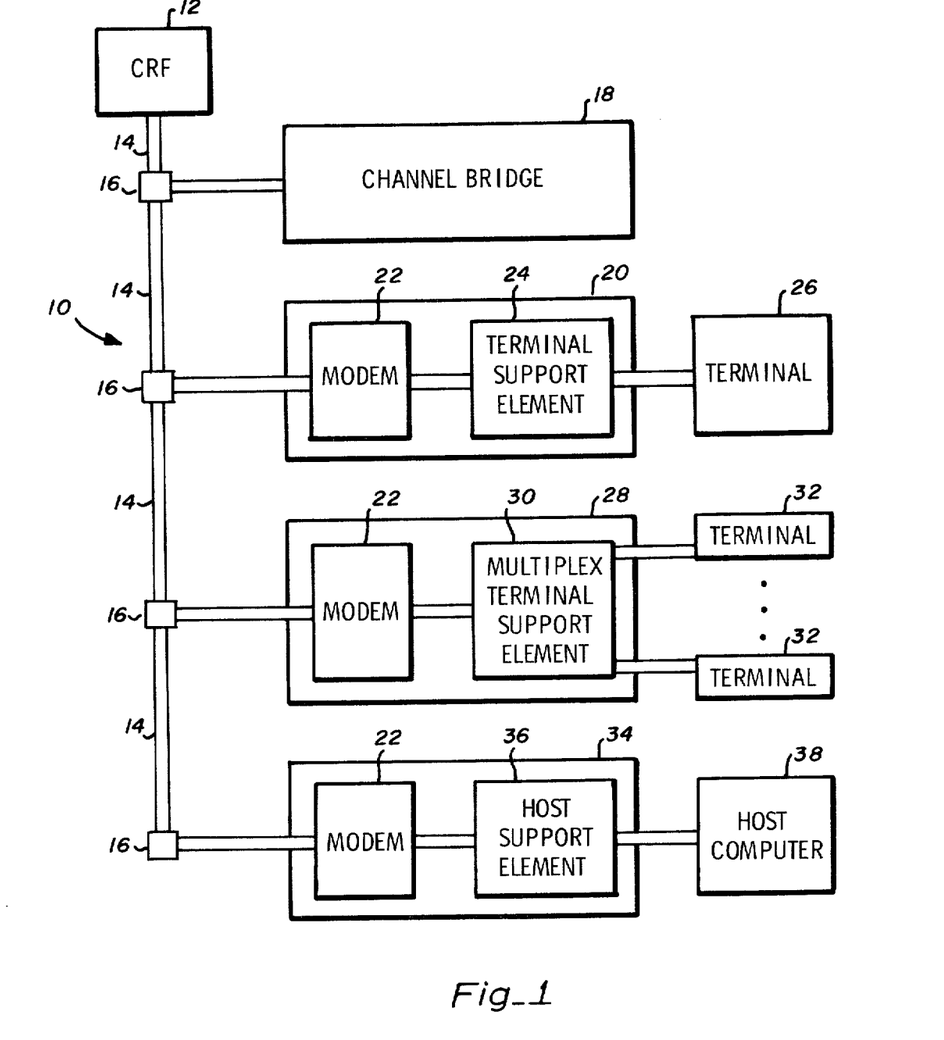
FIG. 1 is a block diagram of an embodiment of a data communication system of the present invention.

Referring to FIG. 1, there is illustrated a block diagram of a data communication system in accordance with the present invention and referred to by the general reference numeral 10. The data communication system 10 includes a central retransmission facility 12 connected at the head-end of a mid-split or sub-split broadband coaxial cable 14. The central retransmission facility 12 is a standard product available commercially such as manufactured by American Modem. The coaxial cable 14 is split by a plurality of unidirectional taps 16. The unidirectional taps 16 are a standard product in the cable television industry. The taps 16 are adapted to block transmission from a device connected to the tap of a signal in the receive frequency bandwidth of the system 10.

The data communication system 10 further includes a channel bridge 18. The channel bridge 18 is connected to the cable 14 at one of the unidirectional taps 16.

The data communication system 10 also includes a terminal interface 20. The terminal interface 20 includes a MODEM 22 and a terminal support element 24 connected to the associated MODEM 22. The terminal interface 20 is connected to the coaxial cable 14 between the MODEM 22 and another of the unidirectional taps 16. The terminal interface 20 is connected to a user terminal 26 at the terminal support element 24.

The data communication system 10 also includes a multiplex terminal interface 28. The multiplex terminal interface 28 includes another of the MODEM 22 and a multiplex terminal support element 30 connected to the associated MODEM 22. The multiplex terminal interface 28 is connected to the cable 14 between the MODEM 22 and another of the unidirectional taps 16. The multiplex terminal interface 28 is connected to a plurality of user terminals 32 at the multiplex terminal support element 30.

The data communication system 10 also includes a host computer interface 34. The host computer interface 34 includes another of the MODEM's 22 and a host support element 36 connected to the associated MODEM 22. The host computer interface 34 is connected to the cable 14 between the MODEM 22 and another of the unidirectional taps 16. The host computer interface 34 is connected to a host computer 38 at the host support element 36.

Figure 2A:
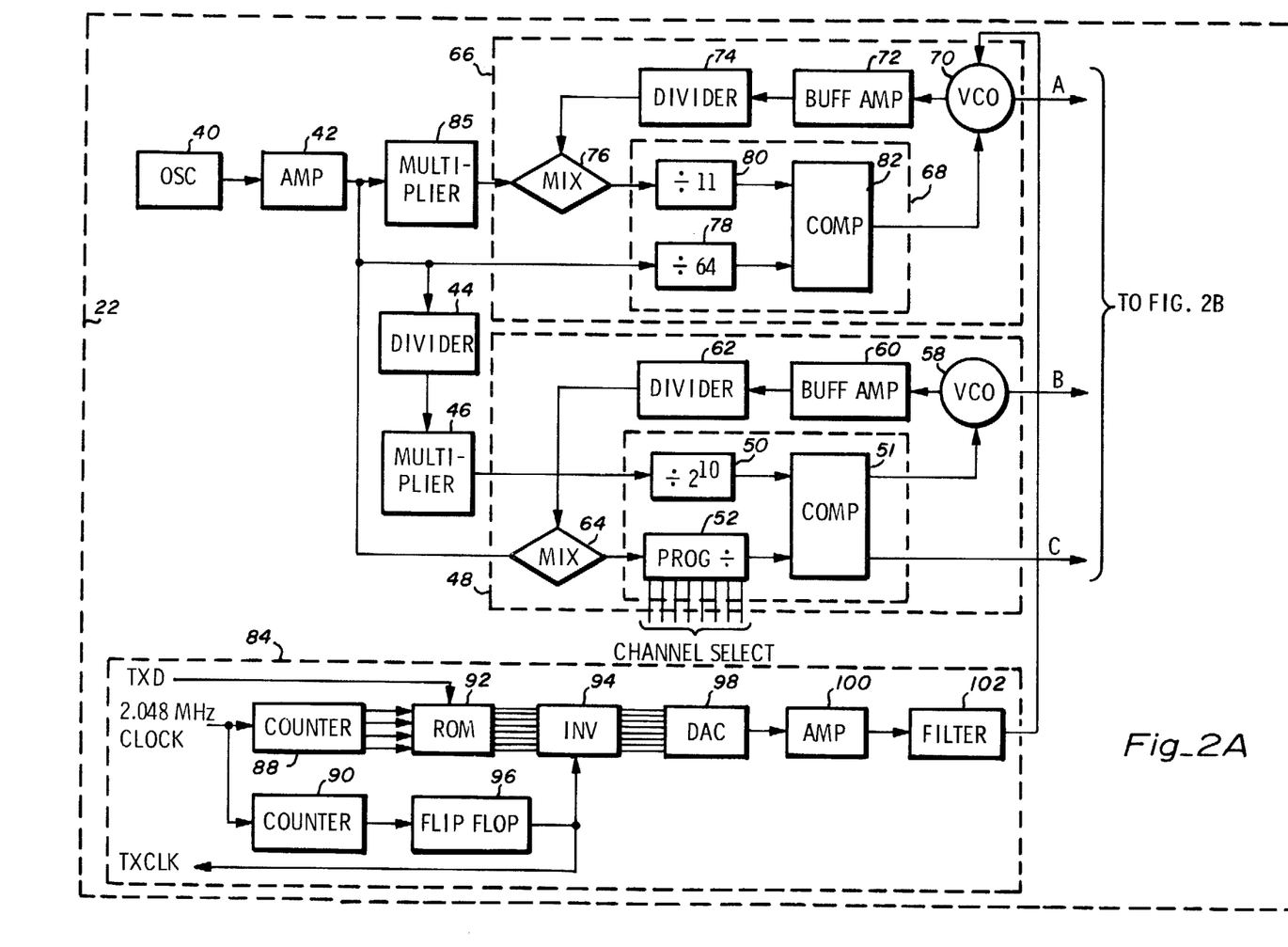
Figure 2B:
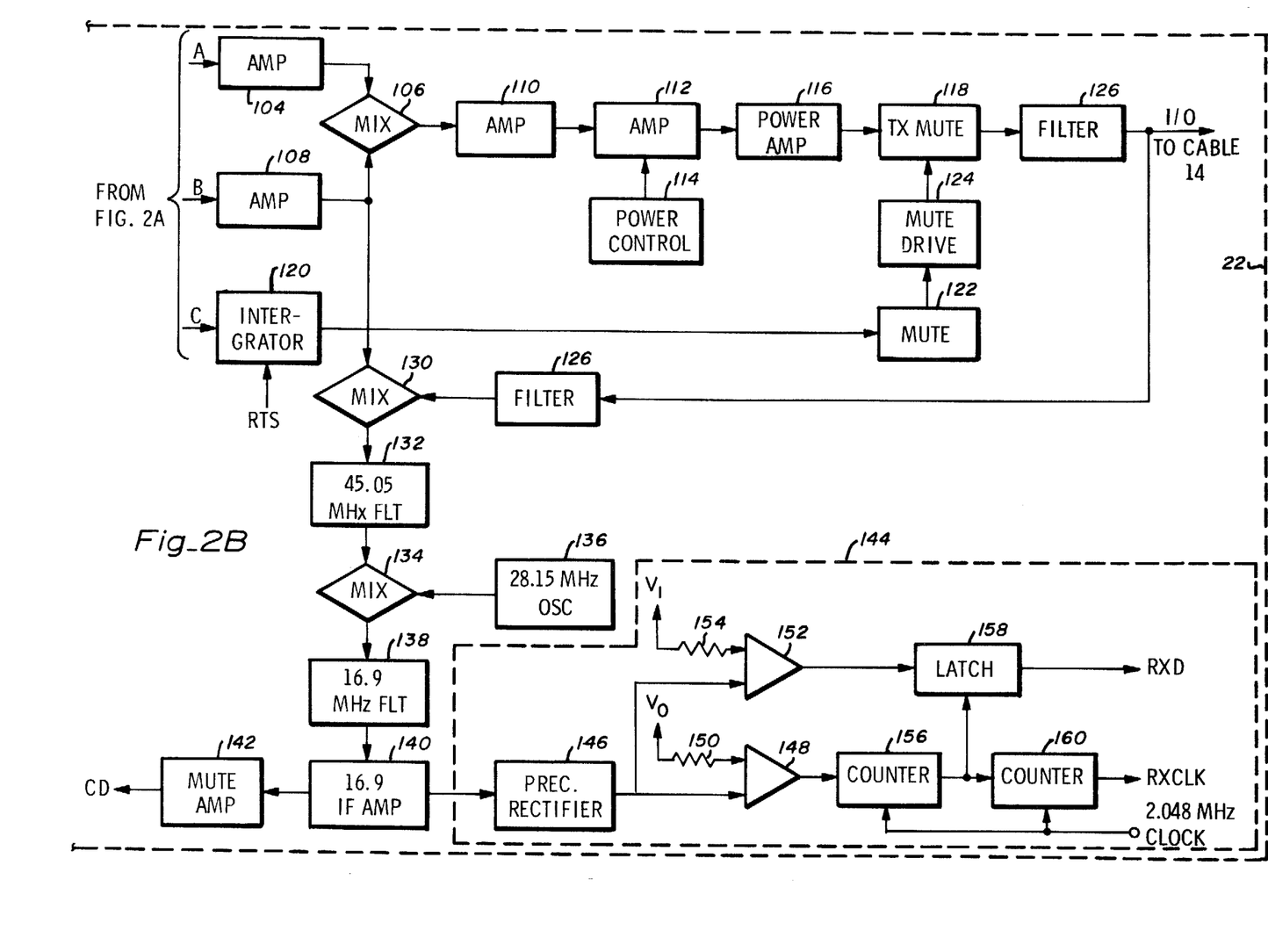

FIG. 2 is a block diagram of the MODEM's 22. The MODEM's 22 of FIG. 1, all of which are identical, includes a temperature compensated 10.24 MHz oscillator 40. The output of the oscillator 40 is fed to an amplifier 42. The output of the amplifier 42 is fed to a divider 44. The divider 44 divides the input frequency by two, thus providing a 5.12 MHz output. The output of the divider 44 is fed to a multiplier 46. The multiplier 46 multiplies the input frequency by five, thus providing a 25.6 MHz output.

The output of the multiplier 46 is fed to a main phase lock loop circuit 48. The multiplier 46 output is connected to a frequency divider 50, which is tied to a phase comparator 51. The comparator 5 is also tied to a programmable divider 52. The divider 50 divides the input signal from the multiplier 46 by a factor of 1024, thus providing a fixed 25 KHz output. The programmable divider 52 has eight channel select inputs which are provided by the terminal support element 24, the multiplex terminal support element 30 or the host support element 36. The binary value of the channel select input determines the divisor of the programmable divider 52. The input of the programmable divider 52 is provided by the feedback loop of the main phase lock loop circuit 48 further hereafter described. The outputs of the divider 50 and the programmable divider 52 are fed to the phase comparator 51. In manufacture, the fixed divider 50, programmable divider 52 and comparator 51 may all be part of a common semiconductor circuit chip.

The feedback loop of the main phase lock loop circuit 48 includes a voltage controlled oscillator 58, a buffer amplifier 60, a divider 62 and a mixer 64. An output of the phase comparator 51 is connected to the voltage controlled oscillator 58. The output of the voltage controlled oscillator 58 is fed to the buffer amplifier 60. The output of the buffer amplifier 60 is fed to the divider 62 which divides the input signal by ten. The output of the divider 62 is fed to the mixer 64 which also has a 10.24 MHz input signal source from the amplifier 42. The output of the mixer 64 is a signal having a frequency equal to the difference of the frequencies of the inputs and is fed to the programmable divider 52.

The operation of the main phase lock loop circuit 48 is believed to be as follows. The oscillator 40 provides a fixed frequency input to the phase lock loop circuit 48. The output of the divider 50 is a fixed 25 KHz signal. This signal is compared to the output of the programmable divider 52 by the phase comparator 51. The voltage controlled oscillator 58 produces a signal having a frequency controlled by the voltage of the input from the comparator 51. When the output frequency of the programmable divider 52 varies from 25 KHz the phase comparator 151 will adjust the voltage of the signal fed to the voltage controlled oscillator 58 until the frequency of the output from the programable divider 52 is 25 KHz at which point the loop is locked and the output of the voltage controlled oscillator 58 is a fixed frequency.

The relationship between the frequency of the output of the voltage controlled oscillator 58 and the binary value of the channel select input of the programmable divider 52 is represented by the following equation:

$$F_o = N(250 \times 10^3) + (102.4 \times 10^6)$$

where $F_o$ is the output frequency of the voltage controlled oscillator 58 and N is the value of channel select input.

The signal from the oscillator 40 is also fed to a transmit phase lock loop circuit 66 connected to the output of the amplifier 42. The transmit phase lock loop circuit 66 includes a transmit phase lock loop block 68, a voltage controlled oscillator 70, a buffer amplifier 72, a divider 74 and a mixer 76. Within the transmit phase lock loop block 68 is a divider 78, a divider 80 and a phase comparator 82 which in manufacture may all be part of a common semiconductor circuit chip.

The output of the amplifier 42 is fed to the input of the divider 78 which is adapted to divide the input frequency by sixty-four. The output of the divider 78 is fed to the phase comparator 82. The divider 80 receives the feedback signal of the transmit phase lock loop circuit 66. The divider 80 divides the input frequency by eleven and feeds the output signal to the phase comparator 82. The output of the phase comparator 82 is fed to the voltage controlled oscillator 70. The voltage controlled oscillator 70 also receives an input from a data encoder network 84. The output of the voltage controlled oscillator is fed to the buffer amplifier 72, the output of which is fed to the divider 74. The divider 74 divides the input frequency by five and its output is fed to the mixer 76. The output of the amplifier 42 is also fed to a multiplier 86 adapted to multiply the input frequency by two. The output of the multiplier 86 is also fed to the mixer 76. The mixer 76 will provide an output signal with a frequency equal to the difference of the frequencies of the inputs from the multiplier 86 and divider 74.

The data encoder network 84 includes a counter 88, a counter 90, a read only memory (ROM) 92, an inverter 94, a flip-flop 96, a digital to analog converter 98, an amplifier 100 and a filter 102. The counter 88 is tied to a 2.048 MHz clock input source which is also fed to the counter 90. The counter 88 has four output lines which represent a binary value that is incremented by one for each clock pulse. When the binary value of the output from the counter 88 is fifteen the next clock pulse will cause the output to be "0". The counter 90 is adapted to produce an output pulse every sixteenth clock pulse.

The four outputs of the counter 88 are fed to the read only memory 92. The read only memory 92 is also connected to receive a transmit data input (TXD) which is provided by the terminal support element 24, the multiplex terminal support element 30 or the host support element 36. The transmit data input provides the digital data which is to be encoded by the data encoder 84 and eventually transmitted by the MODEM 22. The inputs to the read only memory 92 provide the address to a memory location. When a memory location is addressed the contents of that memory location will be output from the read only memory 92.

The output of the read only memory 92 is fed to an inverter 94. The counter 90 also provides an output pulse to the flip-flop 96 which provides an output that changes with each pulse from the counter 90. The output of the flip-flop 96 is fed to the inverter 94. The inverter 94 will output the complement of the input from the read only memory 92 when the input from the flip-flop 96 is a logical "1" and will not output the complement when it is a logical "0".

The output of the inverter 94 is fed to the digital-to-analog converter 98. The digital-to-analog converter 98 outputs a voltage which is selected by the digital inputs from the inverter 94. The output of the digital-to-analog converter is fed to the amplifier 100 the output of which is fed to the filter 102.

The output of the digital to analog converter 98 is an amplitude modulated signal. The amplitude of a half cycle is selected by the transmit data input (TXD) to the read only memory 92. If the transmit data input is a logical "1" then a memory bank is addressed that produces outputs that will cause the digital to analog converter 98 to produce a half cycle signal having an amplitude corresponding to a logical "1". A transmit data input of logical "0" will address a memory bank corresponding to logical "0". The inverter 94 causes every other half cycle from the digital-to-analog converter 98 to be inverted. Thus, the digital transmit data input (TXD) into the data encoder 84 is converted to an amplitude modulated signal with two bits of data per cycle. The output of the flip-flop 96 provides a transmit clock and is fed to the terminal support element 24, the multiplex terminal support element 30 or the host support element 36. The transmit clock tells the support element 24, 30 or 36 when to output the next bit of data.

The amplitude modulated signal from the data encoder network 84 is fed to the voltage controlled oscillator 70 of the transmit phase lock loop circuit 66. The output of the voltage controlled oscillator 70 thus will be a frequency modulated signal with a center frequency generated by the transmit phase lock loop circuit 66. The center frequency generated by the transmit phase lock loop circuit 66 is 111.2 MHz.

The output signal from the transmit phase lock loop circuit 66 is fed to an amplifier 104. The output of the amplifier 104 is fed to a mixer 106. The output of the main phase lock loop circuit 48 from the voltage controlled oscillator 58 is fed to an amplifier 108. The output of the amplifier 108 is also fed to the mixer 106. The mixer 106 produces an output signal having a frequency equal to the difference of the frequencies of the inputs. Thus, the transmit frequency at the output of the mixer 106 will be a function of the channel select input of the programmable divider 52.

The output of the mixer 106 is fed to an amplifier 110. The output of the amplifier 110 is fed to a second amplifier 112. The second amplifier 112 also receives an input from a power control circuit 114. The output of the amplifier 112 is fed to a power amplifier 116 the output of which is then fed to a transmit mute 118.

An integrator 120 has an input connected to the phase comparator 51 and a request to send input from the terminal support element 24, the multiplex terminal support element 30 or the host support element 36. The output of the integrator 120 is fed to a mute 122. The output of the mute 122 is fed to a mute drive 124 the output of which is fed to the transmit mute 118. When the main phase lock loop circuit 48 is not in a locked state the phase comparator 51 will provide an output to the integrator 120. The main phase lock loop circuit 48 would be in an unlocked state for a brief period after the channel select input is changed. When this condition exists the integrator 120 will provide a signal to the mute 122 which will cause the transmit mute 118 to prevent the MODEM 22 from transmitting a signal. When data is ready to be transmitted the terminal support element 24, multiplex terminal support element 30 or the host support element 36 will send a request to send (RTS) signal to the integrator 120. When the integrator 120 receives a request to send a signal it will provide an output to the mute 122 which will cause the transmit mute 118 to allow the signal from the power amplifier 116 to be fed to a filter 126. The output of the filter 126 is fed to the cable 14. Thus, the MODEM 22 will transmit a signal only when the main phase lock loop circuit 48 is locked and a request to send signal is received from the terminal support element 24, the multiplex terminal support element 30 or the host support element 36.

The MODEM 22 may also receive a signal from the cable 14 which is fed to a filter 128. The output of the filter 128 is fed to a mixer 130 which also receives an input from the main phase lock loop circuit 48 which is amplified by the amplifier 108. The output signal from the mixer 130 has a frequency equal to the difference of the frequencies of the inputs and is fed to a filter 132. The output of the filter 132 is fed to a mixer 134 which also receives an input from a 28.15 MHz oscillator 136. The output signal from the mixer 134 has a frequency equal to the difference of the frequencies of the inputs and is fed to a filter 138. The output of the filter 138 is fed to a 16.9 MHz IF amplifier 140. An output of the IF amplifier 140 is fed to a mute amplifier 142. Thus, when a signal of the cable 14 is received by the MODEM 22, the mute amplifier 142 will output a carrier detect (CD) signal. The carrier detect signal is fed to the terminal support element 24, the terminal multiplex support element 30 or the host support element 36.

The output of the IF amplifier 140 is an amplitude modulated signal which is fed to a data decoder network 144. The data decoder 144 includes a precision rectifier 146. The precision rectifier 146 inverts the lower half of each cycle of the input. The output of the precision rectifier 146 is fed to a zero cross detector 148 which also has a zero reference input $V_0$ connected through a resistive element 150. When the input to the zero cross detector 148 from the precision rectifier 146 is zero volts the zero cross detector 148 will produce an output pulse. The output of the precision rectifier 146 is also fed to a one detector 152 which also receives a reference input $V_1$ connected through a resistive element 154. When the input to the one detector 152 from the precision rectifier 146 reaches the level corresponding to a logical "1" the one detector 152 will produce an output pulse. The level of a half cycle corresponding to a logical "0" is lower than the level corresponding to a logical "1". Thus, when a half cycle carries a "0" bit the one detector will not produce an output pulse.

The output of the zero cross detector 148 is fed to a counter 156. The counter 156 receives a 2.048 MHz clock input. The clock frequency is sixteen times the data rate. The counter 156 is reset to zero each time a zero cross is detected by the zero cross detector 148. The counter 156 will produce an output pulse when the count reaches eight. The counter 156 will then remain in an inactive state until it receives a reset pulse from the zero cross detector 148. A latch 158 receives inputs from the one detector 152 and the counter 156. When the latch receives a pulse from the counter 156 it will output the voltage present at the input from the one detector 152. The counter 156 outputs a pulse at the peak of a half cycle of the input to the data decoder 144. Thus, the latch 158 outputs the received data in a digital form.

The data decoder network 144 also provides a receive clock output (RXCLK). The counter 156 sends a pulse to a counter 160 which also receives an input from the 2.048 MHz clock. The input pulse to the counter 160 from the counter 156 resets the counter 160. The counter 160 will produce an output pulse some number of clock pulses later. The receive clock output (RXCLK) and the receive data output (RXD) of the data decoder 144 are fed to the terminal support element 24, the multiplex terminal support element 30 or the host support element 36. When the support element 24, 30 or 36 receives a pulse from the receive clock output it will read the receive data output (RXD). Thus, the number of clock pulses from the 2.048 MHz clock that will cause the counter 160 to output a pulse should be less than sixteen so that the output of the latch 158 is read by the terminal support element 24, the multiplex support element 30 or the host support element 36 before the next bit of data is output from the latch 158.

Figure 3:
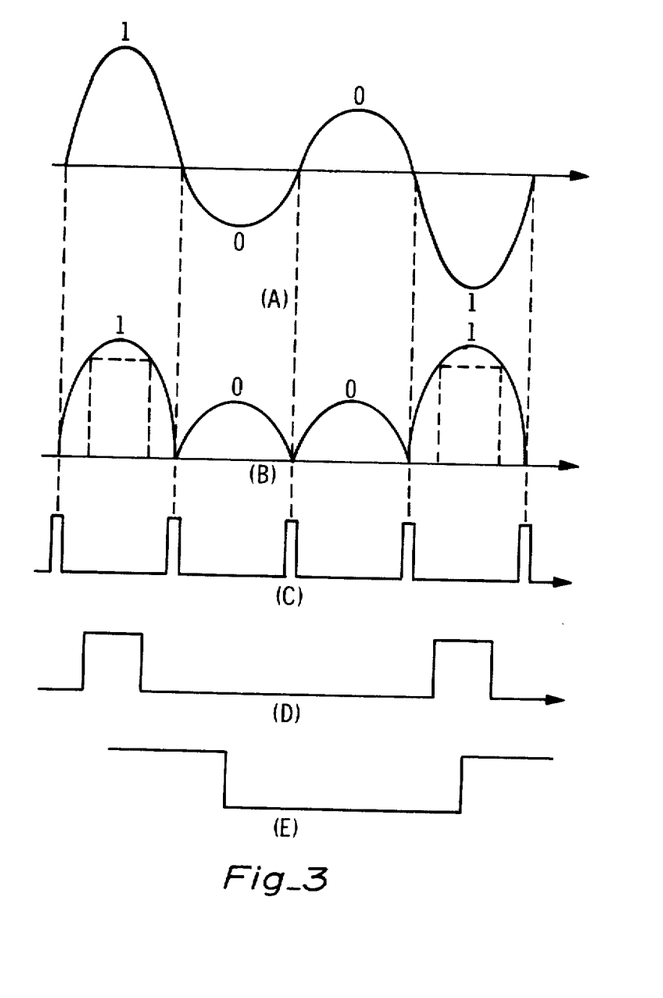

In FIG. 3 there is illustrated waveforms for various input and output signals of the data decoder network 144 of the MODEM 22. FIG. 3(A) illustrates an input signal to the data decoder 144 carrying the four bit code of 1001. Each cycle of the signal contains two bits of data where each bit is represented by the amplitude of a half cycle. FIG. 3(B) illustrates the waveform of the output signal from the precision rectifier 146. It may be noted that the lower half cycle of the input to the precision rectifier 146 is inverted. The output from the zero cross detector 148 is illustrated in FIG. 3(C). FIG. 3(D) illustrates the output from the one detector 152 and FIG. 3(E) illustrates the output from the latch 158.

Figure 4:
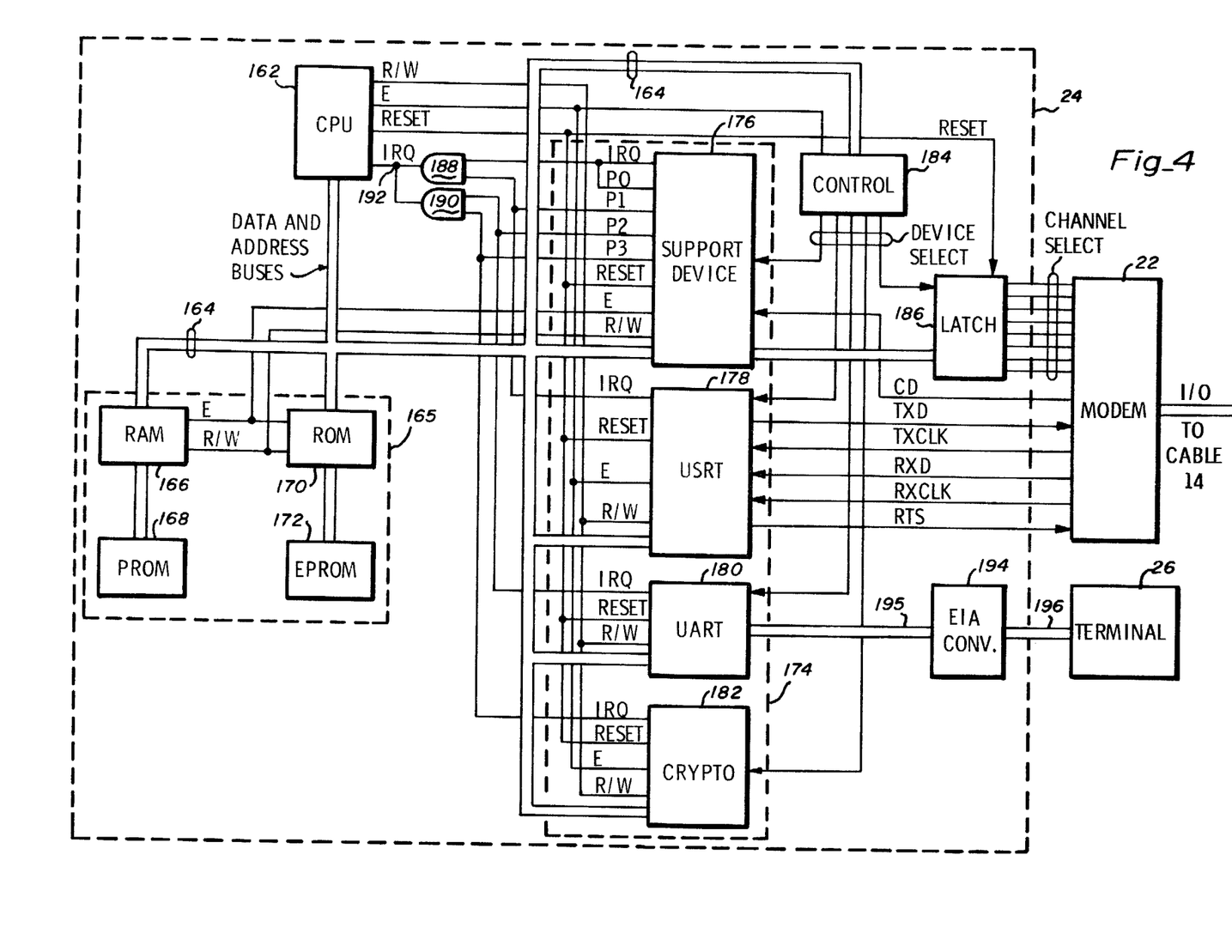
FIG. 4 is a block diagram of the multiplex terminal support element of the system of FIG. 1.

FIG. 4 is a block diagram of the terminal support element 24 of FIG. 1 and further illustrating the interface of MODEM 22 and the terminal 26. The terminal support element 24 includes a central processor unit (CPU) 162 connected to data and address buses 164. The terminal support element 24 also includes a memory block 165 including a random access memory chip (RAM) 166, a programmable read only memory chip (PROM) 168, a read only memory chip (ROM) 170, and an erasable programmable read only memory chip (EPROM) 172. Each chip of the memory block 165 is connected to the data and address buses 164.

The terminal support element 24 also includes an input/output block 174 which includes a support device 176, a universal synchronous receiver/transmitter (USRT) 178, a universal asynchronous receiver/transmitter (UART) 180 and a data encryption/decryption device (CRYPTO) 182. Each chip of the input/output block 174 is connected to the data and address buses 164.

The data and address buses 164 are also connected to a control chip 184. The support device 176 is connected by a plurality of lines to a latch 186. The control chip 184 is connected from several device select outputs to each of the chips in the input/output block 174 and to the latch 186. The control chip 184 receives three address lines which are decoded by the control chip 184.

The control chip 184 will then provide an output on one of the device select lines to the appropriate chip corresponding the address < received.

Each of the chips in the input/output block 174 has an interrupt request output (IRQ). The IRQ output of the support device 176 is connected to the I/O port line P0 of the support device 176 and to one input of an open collector AND gate 168. The IRQ output of the ADLC 178 <is connected to the I/O port line P1 of the support device 176 and to one input of the AND gate 188. The IRQ output of the UART 180 is connected to the I/O port line P2 of the support device 176 and <to one input of an open collector AND gate 190. The IRQ output of the CRYPTO 182 is connected to the I/O port line P3 of the support device 176 and to one input of the AND gate 190. The outputs of the AND gates 188 and 190 are connected at a terminal 192. The terminal 192 is connected to the IRQ input of the CPU 162.

When one of the chips in the input/output block 174 requires servicing by the CPU 162 the chip will generate an interrupt request. The IRQ output is normally high and when an interrupt request is generated the IRQ output goes low. Thus, when no interrupt requests are outstanding the inputs to the AND gates 188 and 190 are high and the outputs of the AND gates 188 and 190 are high. When an interrupt request is generated an input to the AND gate 188 or 190 will go low causing the output of the other AND gate 188 or 190 to be drawn low. This result is achieved because the AND gates 188 and 190 are open collector-type AND gates. When the interrupt request is received by the CPU 162 it will read a status register of the support device 176. The status register of the support device 162 is set by the I/O port line P0, P1, P2 or P3 to indicate the source of the interrupt request. The CPU 162 will then service the appropriate chip of the input/output block 174.

The CPU 162 has a RESET output. The RESET output is connected to the devices in the input/output block 174 and to the latch 186. When the power to the terminal support element 24 is turned on the CPU 162 will generate an output on the RESET line. The devices receiving the RESET signal are set to initial conditions.

The CPU 162 has a clock synchronization output labeled E. The E output of the CPU 162 is connected to the RAM 166, the ROM 170, the support device 176, the ADLC 178, the CRYPTO 182 and the control chip 184. The clock synchronization output E from the CPU 162 provides a clock signal to the connected devices. The CPU 162 has an output labeled R/$\overline{W}$ connected to the RAM 166, the ROM 170, the support device 176, the USRT 178, the UART 180 and the CRYPTO 182. The R/$\overline{W}$ output of the CPU 162 indicates to the connected devices whether the CPU 162 is in a read or write state.

The latch 186 has eight output lines connected to the channel select inputs of the MODEM 22. The carrier detect output (CD) from the MODEM 22 is connected to the support device 176. The ADLC 178 has a TXD output connected to the MODEM 22. The USRT 178 receives TXCLK, RXD and RXCLK inputs from the MODEM 22. The RTS output from the USRT 178 is connected to the MODEM 22.

An EIA converter 194 is connected to the UART 180 by a plurality of lines 195 which carry the necessary signals for the terminal 26. The EIA converter 194 is connected to the terminal 26 by a plurality of lines 196. The EIA converter 194 transforms the signals passing between the USART 180 and the terminal 26 to the appropriate level.

The CRYPTO 182 is an optinal feature of the terminal support element 24. The CRYPTO 182 provides for encryption and decryption of data transmitted over the cable 14. The PROM 168 provides the "key" for the encryption and decryption. A receiving support element 24, 30 or 36 must have the same "key" as the transmitting support element 24, 30 or 36.

The RAM 166 provides for extended data buffering to increase the capability of the data communication system 10. The EPROM 172 allows for the addition of special features to the data communication system 10.

Figure 5:
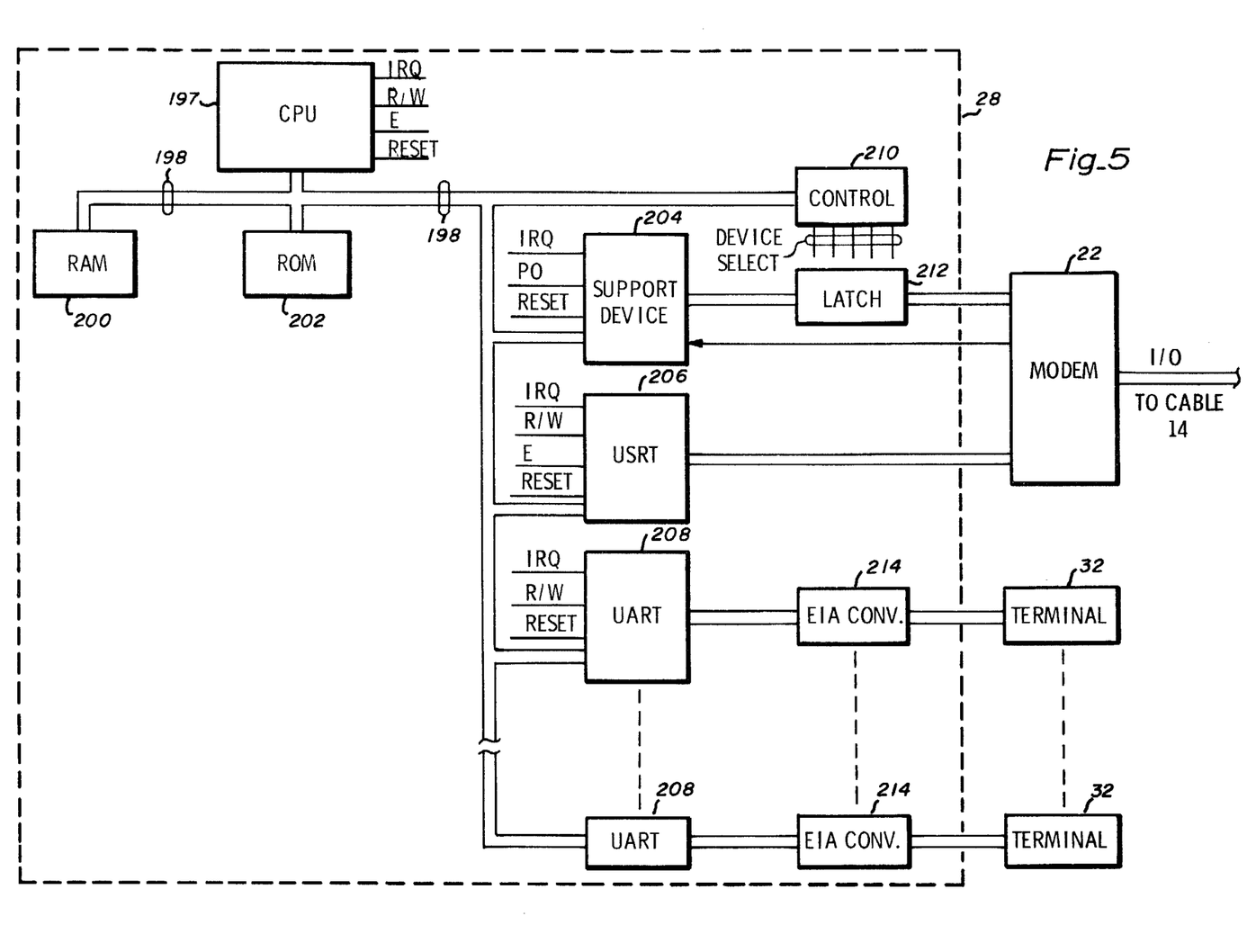
FIG. 5 is a block diagram of the multiplex terminal support element of the system of FIG. 1.

FIG. 5 is a block diagram of the multiplex terminal support element 30 and also shows the connection to the MODEM 22 and to the terminals 32. The architecture of the multiplex terminal support element 30 is similar to that of the terminal support element 24. The encryption/decryption feature illustrated in FIG. 4 has been omitted and also the EPROM 172 for provision of special features is not shown. These features may be included in the multiplex terminal support element 30 but are omitted to simplify the description. The CRYPTO 174 and PROM 168 would be necessary in the multiplex terminal support element 30 if encrypted data is to be received or transmitted.

The multiplex terminal support element 30 includes a CPU 197 is connected to a data bus and address bus 198. A RAM 200 is connected to the data and address buses 198. The RAM 200 includes approximately two thousand bytes of memory. A ROM 202 is also connected to the data and address buses 198. The ROM 202 includes approximately four thousand bytes of memory. Also connected to the data and address buses 198 are a support device 204, a USRT 206, eight UART's 208 and a control 210. The support device 204 is connected to a latch 212 by eight parallel lines. The latch 212 is connected to the channel select input of the MODEM 22 by eight parallel lines. The support device 204 receives a carrier detect input from the MODEM 22. The USRT 206 is connected to the MODEM 22. Each of the eight UART's 208 is connected to an EIA converter 214 and each of the eight EIA converters 214 is connected to one of the eight terminals 32.

The multiplex terminal support element 30 requires a larger block of random access memory than the terminal support element 24. The multiplex terminal support element 30 also includes eight UART's 208 where the terminal support element 24 includes only one UART 180. The eight UART's 208 are necessary to enable the multiplex terminal support element 30 to be connected to the eight terminals 32. The read/write, clock synchronization reset and interrupt request signal are connected to and from the CPU 197 in the same manner as with the CPU 162 of the terminal support element 24. The device select outputs from the control 210 are connected in the same manner as for the control 184 of the terminal support element 24, the only difference being that additional device select outputs are necessary from the control 210 to connect to the additional UART's 208.

Figure 6:
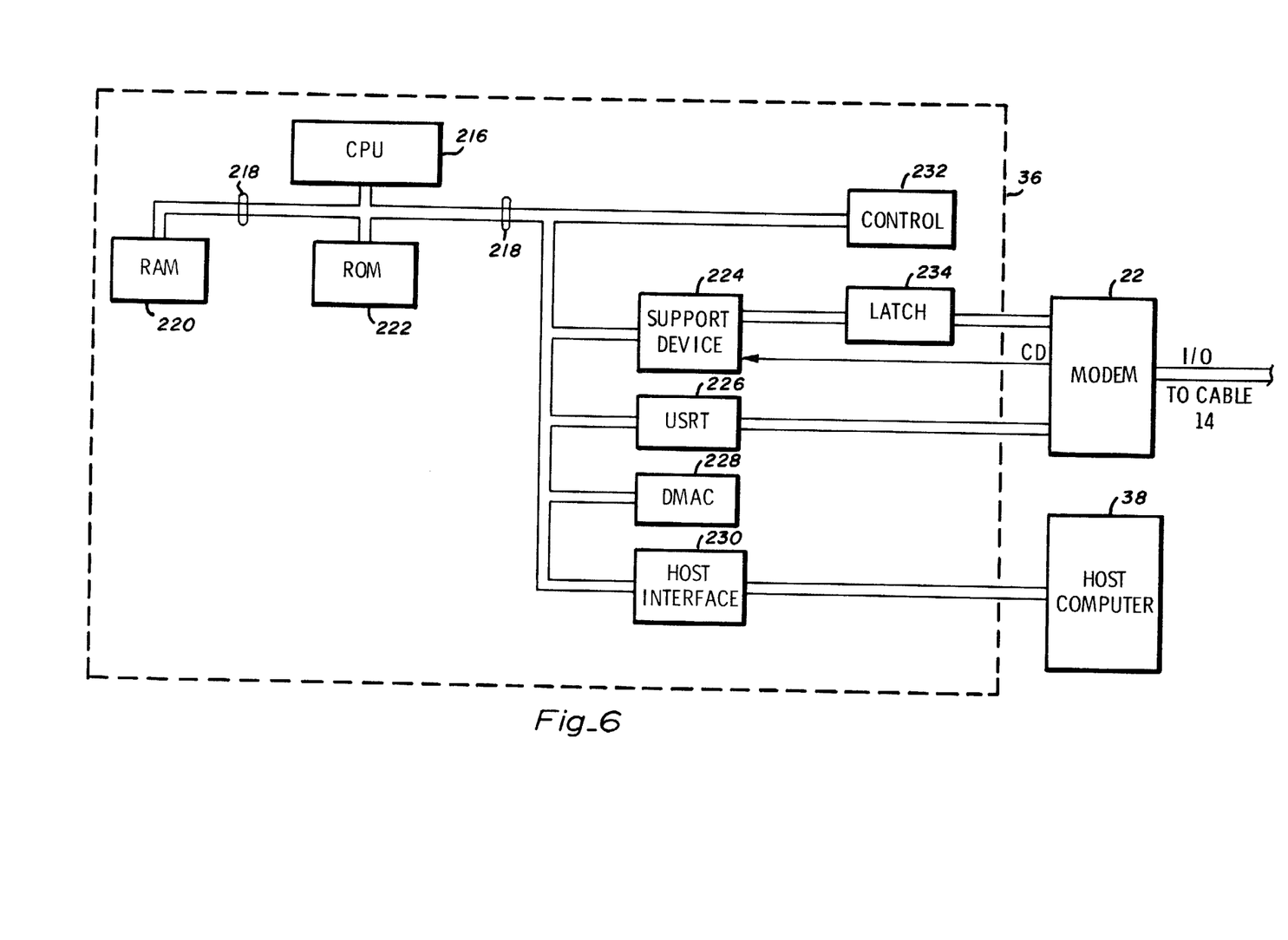
FIG. 6 is a block diagram of the host support element of the system of FIG. 1.

FIG. 6 is a block diagram of the host support element 36 of FIG. 1 and also shows the connection to the MODEM 22 and to the host computer 38. The architecture of the host support element 36 is similar to that of the terminal support element 24 and the multiplex terminal support element 30. Again the encryption/decryption feature and the EPROM 172 have been omitted for simplification.

The host support element 36 includes a CPU 216. The CPU 216 is connected to a data bus and address bus 218. A RAM 220 is connected to the data and address buses 218. The RAM includes approximately two thousand bytes of memory. A ROM 222 is also connected to the data and address buses 218. The ROM 222 includes approximately four thousand bytes of memory. Also connected to the data and address buses 218 are a support device 224, a USRT 226, a direct memory access controller (DMAC) 228, a host interface 230 and a control 232. The support device 224 is connected to a latch 234 by eight parallel lines. The latch 234 is connected to the channel select input of the MODEM 22 by eight parallel lines. The support device 224 receives a carrier detect input from the MODEM 22. The USRT 226 is connected to the MODEM 22. The host interface 230 is connected to the host computer 38.

The host interface 230 comprises a circuit supplied by the manufacturer of the host computer 38. The host interface 230 will interface the signals from the host computer 38 to the host support element 36. The DMAC 228 transfers data directly between the RAM 220 and the host interface 230. The direct memory access feature is included in the host support element 36 to facilitate the higher speed generally encountered with the host computer 38.

Figure 7:
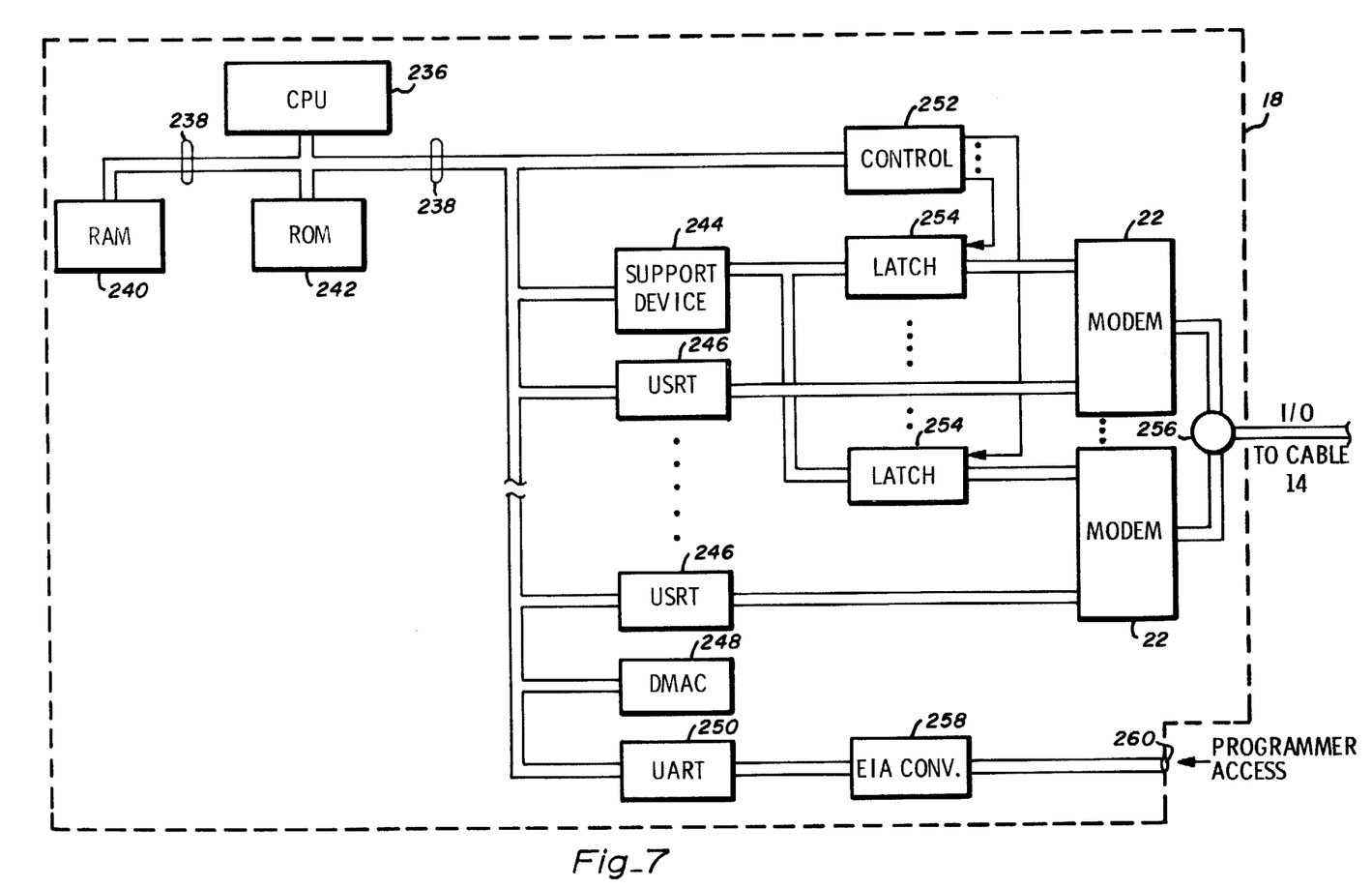
FIG. 7 is a block diagram of the channel bridge of the system of FIG. 1.

FIG. 7 is a block diagram of the channel bridge 18 of FIG. 1. The channel bridge 18 includes a CPU 236 connected to a data bus and address bus 238. The channel bridge 18 also includes a RAM 240 and a ROM 242 each connected to the data and address buses 238. Also connected to the data and address bus 238 are a support device 244, a plurality of USRT's 246, a DMAC 248, a UART 250 and a control 252. The support device 244 is connected to a plurality of latches 254 by eight parallel lines. Each of the latches 254 is connected to the channel select input of each of the MODEM's 22. Each of the USRT's 246 is connected to one of the MODEM's 22. Each of the MODEM's 22 is connected to a signal splitter 256. The signal splitter 256 is connected to the coaxial cable 14. The UART 250 is connected to an EIA converter 258. The EIA converter 258 has an input/output terminal 260 to provide programmer access to the channel bridge 18. The control 252 has a separate output connected to each of the latches 254.

The channel bridge 18 receives signals on a channel and searches for packets of data directed to a different channel and then retransmits those packets onto the appropriate channel. Each MODEM 22, included in the channel bridge 18, is set to a different channel, thus the channel bridge 18 is capable of providing a direct bridge between a number of channels equal to the number of MODEM's 22 included in the channel bridge 18. Data received by the MODEM 22 is transferred to the USRT 246. When data is being received by several USRT's 246 simultaneously the CPU 236 will become overburdened and incapable of transferring the data to the RAM 240. Thus, the DMAC 248 is used to control the transfer of data from the USRT's 246 to the RAM 240.

The channel on which the MODEM's 22 operate is selected by storing the appropriate value for the desired channel in the support device 244, then the appropriate latch 254 is selected by the control 252 and the output of the latch 254 is held at the desired value. The channel of each of the MODEM's 22 may be set by enabling the appropriate latch 254.

In practice the number of channels bridged by the channel bridge 18 is limited by the rate at which received data may be transferred to the RAM 240 and back to the USRT 246. Thus, several channel bridges 18 may be required for the data communication system 10. Where several channel bridges 18 are included in the data communication system 10 a packet of data may need to be routed through more than one channel bridge 18. Routing through more than one channel bridge 18 may be handled by means of a routing table stored in the RAM 240.

Figure 8:
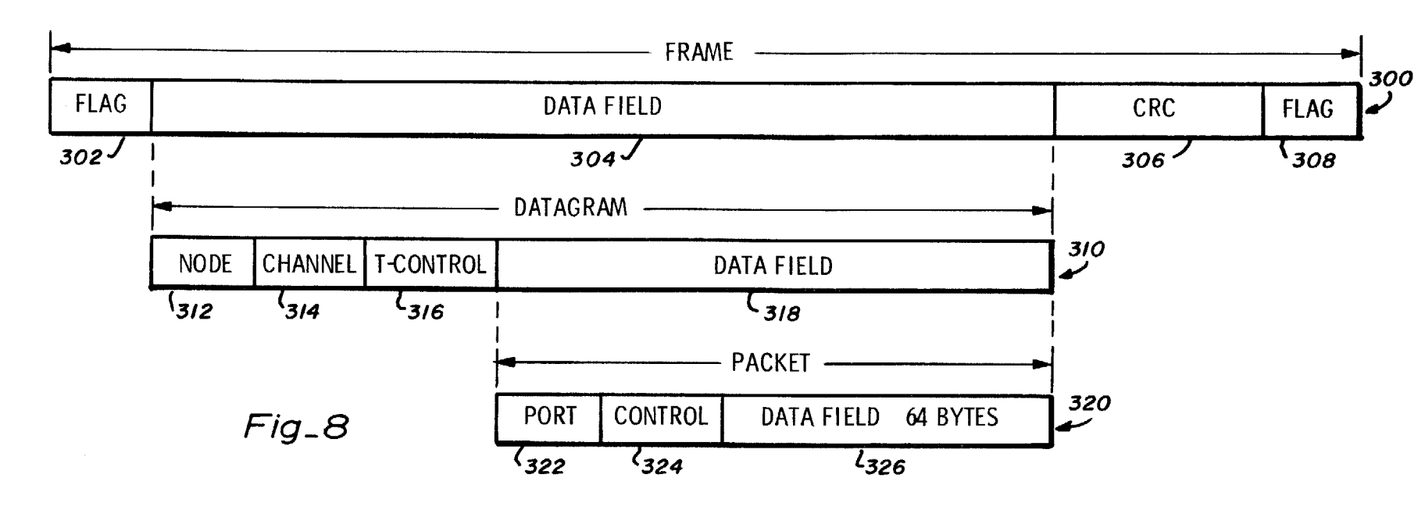
FIG. 8 is a diagram illustrating the contents and format of a data frame in accordance with the present invention.

FIG. 8 illustrates the data format used by the data communication system 10. The terminal interface 20, the multiplex terminal interface 28, or the host computer interface 34 will transmit a frame of data, referred to by the general reference numeral 300, onto the cable 14. The frame of data 300 is comprised of bytes of data. Generally each byte is comprised of eight bits of data where a bit is a logical "1" or "0". The first byte of the frame 300 is a flage 302. The flag 302 has a fixed value of 01111110 and is used to indicate to a receiver that a stream of data is following. Following the flag 302 is a data field 304. Following the data field 304 is a cyclic redundancy check field 306. The cyclic redundancy check field 306 is two bytes in length and is a value generated by the transmitter for the data field 304. The receiver generates a cyclic redundancy check value for the received frame 300 and by comparing with the value of the received cyclic redundancy check field 306 the receiver detects transmission errors. Following the cyclic redundancy check field 306 is a flag 308. The flag 308 has the same value as the flag 302 and indicates the end of the frame 300.

The data field 304 comprises a datagram referred to by the general reference numeral 310. The datagram 310 includes a destination node address 312. The destination node address 312 is the first byte of the datagram 310 and indicates the node which is to receive the frame 300. In the present preferred embodiment a node is defined to be a point in the cable 14 where the terminal interface 20, the multiplex terminal interface 28 or the host computer interface 34 is connected. Each node is assigned a unique address.

The datagram 310 also includes a channel number field 314 following the destination node address 312. The channel number field 314 is one byte in length. The channel number field 314 indicates the channel on which the destination node is located. When the destination node's channel is different from the source node's channel the frame 300 is routed through the channel bridge 18. The channel on which a node is located is determined by the channel select input to the MODEM 22.

Following the channel number field 314 is a transport control field 316. The transport control field 316 is one byte in length. The transport control field 316 is followed by a data field 318.

The data field 318 comprises a packet referred to by a general reference numeral 320. The first byte of the packet 320 is a port field 322. The port field 322 is one byte in length and indicates the destination within a node, for example, one of the terminals 32 connected to the multiplex terminal interface 28. A control field 324 follows the port field 322 and is one byte in length. Following the control field is a data field 326 which can be any length less than 64 bytes.

Figure 8A:
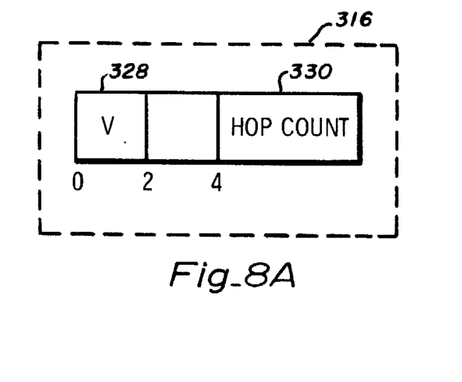

FIG. 8A illustrates the subfields of the transport control field 316. A version field 328 comprises the first two bits of the transport control field 316. The version field 328 is used to indicate the format of the data contained in the packet 320. The third and fourth bits of the transport control field 316 are not used in the presently preferred embodiment. A hop count field 330 comprises the last four bits of the transport control field 316. When a packet 320 is transmitted by a node the hop count field 330 has an initial value of seven. Each time the packet 320 is routed through the channel bridge 18 the value of the hop count field is decremented by one. When the value of the hop count field equals zero, the packet 320 is discarded. This prevents indefinite looping of packets in the data communication network 10 due to transmission errors.

Figure 8B:
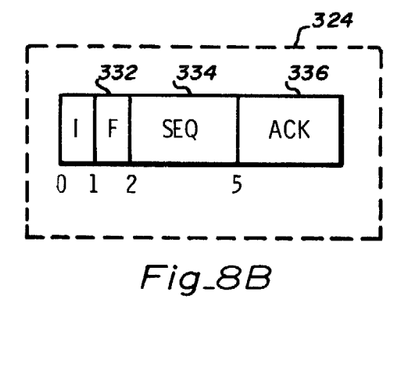

FIG. 8B illustrates the subfields of the control field 324 when the first bit of the control field 324 is a "1". When the first bit of the control field 324 is a "1" the packet 320 is a data packet. In a data packet the data field 326 contains the information being communicated. Following the first bit of the control field 316 in a data packet is a flow control bit 332. The flow control bit 332 is used to adjust for a possible speed mismatch between the transmitting node and the receiving node. Following the flow control bit 332 in a data packet is a sequence field 334. The sequence field 334 is three bits in length. Following the sequence field 334 in a data packet is an acknowledgement field 336. The acknowledgement field 336 is three bits in length.

The sequence field 334 is incremented each time a packet is sent, thus, indicating the order of the packets sent and enabling the receiver to disassemble the packets 320 in the correct order. The acknowledgement field indicates the value of the sequence field 334 for the last correctly received data packet.

When a receiving node runs out of buffer space to store the received data it will discard the received packet 320 and transmit a data packet with the value of the acknowledgement field 336 set to the value of the sequence field 334 of the previously received packet 320 and will set the flow control bit 332 to enable flow control. In the flow control enabled state the transmitting node will delay transmission of the next packet 320 by a predetermined time delay.

When the transmission of a packet 320 has not been acknowledged by the receiving node, then after a predetermined time interval the transmitting node will retransmit the unacknowledged packet. After five retransmission attempts the connection will be aborted.

Figure 8C:
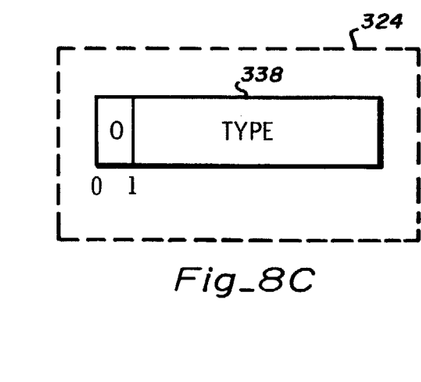

FIG. 8C illustrates the control field 324 when the first bit is "0". A "0" in the first bit of the control field 324 indicates a control packet. A control type field 338 follows the first bit of the control packet 324. The control type field 324 contains a control message for the other node in a connection. The types of control messages include open connection request, open connection acknowledged, open connection nonacknowledged, close connection request and close connection acknowledged.

An open connection request control message signals to another (receiving) node in the data communication system 10 that the transmitting node requests a connection. An open connection acknowledged control message is sent by the receiving node to signal the transmitting node that the receiving node is ready to accept transmitted data. At this point a connection is established between the transmitting and receiving nodes. An open connection nonacknowledged is sent by the receiving node to signal the transmitting that the receiving node is not ready to receive transmitted data in which case no connection is established. A close connection request control message signals the other node in a connection to close the connection. A close connection acknowledged signals the other node in a connection that a closed connection request was received and thus terminates the connection.

The operation of the data communication system 10 may now be illustrated by way of describing a communication between the terminal 26 and the host computer 38. In such a situation, a user will type a request at the terminal 26 to open a connection with the host computer 38. The user at this time will input the address of the host computer 38. The request will be transmitted to the UART 180 of the terminal support element 24. The UART 180 will output an interrupt request signal to the CPU 162. The CPU 162 will respond to the interrupt request by reading the status register of the UART 180 which will tell the CPU 162 to begin transferring the contents of the registers to the RAM 166. After the data from the terminal 26 has been transferred to the RAM 220 of the host support element 36, the CPU 162 will then read the contents of the RAM 166 which will contain the open connection request. The CPU 162 will assemble the datagram 310 (illustrated in FIG. 8) with the node and channel address for the host computer 38, set the version and hot count of the transport control field 316, set the first bit of the control field 324 to "0" and set the value of the control type field 338 to the code for an open connection request control message. The data field 326 will contain the address of the terminal interface 20. The assembled datagram 310 is then transferred to the USRT 178 of the terminal support element 24. As the datagram 310 is received by the USRT 178, it will generate a cyclic redundancy check value whiich will be placed in the cyclic redundancy check field 306.

Before the CPU 162 enables the USRT 178 to transfer the data to the MODEM 22, the CPU 162 will read the status register of the support device 176 which will indicate whether or not the carrier detect signal is being generated by the MODEM 22. If the carrier detect signal is being output by the MODEM 22, indicating that coaxial cable 14 is being used, then the CPU 162 will delay enabling the USRT 178 until the carrier detect signal indicates that cable 14 is free. When the cable 14 is free the CPU 162 will enale the USRT 178. The USRT 178 will transmit a request to send signal to the MODEM 22. When the MODEM 22 receives the request to send signal it will disenable the transmit mute 118 thus, allowing an output signal to be broadcast onto the coaxial cable 14. The USRT 178 will then begin to serially transmit the frame 300 to the MODEM 22.

Each time a transmit clock pulse is received from the MODEM 22 the USRT 178 will output a bit of data. The bit of data will be received by the data encoder 84 of the MODEM 22. The data encoder 84 will encode the data into an amplitude modulated output. The amplitude modulated output of the data encoder 84 is received by the voltage controlled oscillator 70. The frequency of the output from the voltage controlled oscillator 70 is determined by the voltage of the inputs from the phase comparator 82 and the data encoder 84. The voltage of the input from the data encoder 84 will be constantly varying, thus, the output frequency from the voltage controlled oscillator 70 will vary according to the amplitude of the input from the data encoder. Thus, the data is encoded into a frequency modulated signal. The output of the voltage controlled oscillator 70 is mixed with the output of the main phase lock loop circuit 56 by the mixer 106, thereby making the transmit frequency a function of the channel select input. The output of the mixer 106 is amplified and then transmitted onto the cable 14. When the entire frame 300 has been output from the URST 178 the request to send signal will be turned off and the MODEM 22 will cease transmitting.

The signal transmitted by the MODEM 22 will be received by the central retransmission facility 12. The central retransmission facility 12 translates the frequency of the received signal to a mathematically related higher frequency and rebroadcasts the signal at the higher frequency. In the preferred embodiment the central retransmission facility will rebroadcast the signal at a frequency 156.25 MHz higher than the frequency of the received signal. The unidirectional taps 16 permit only signals in the frequency range of approximately 17.7 to 47.7 MHz to be transmitted in the direction towards the central retransmission facility 12 and only signals in the frequency range of approximately 173.95 to 203.95 MHz to be transmitted in the direction away from the central retransmission facility 12. Thus, a communication channel is comprised of a transmit frequency bandwidth in the frequency range of approximately 17.7 to 47.7 MHz and a receive frequency range of approximately 123.95 to 203.95 MHz.

The signal rebroadcast by the central retransmission facility 12 will be received by the MODEM 22 included in the host computer interface 34. The signal received by the MODEM 22 will be fed through the mixer 130 within the MODEM 22. The mixer 130 will also receive an input from the main phase lock loop circuit 48. Thus, both the transmit frequency and receive frequency are jointly stepped when the channel select input to the main phase lock loop circuit 48 is changed. The output of the mixer 130 is eventually fed to the IF amplifier 140. The IF amplifier 140 converts the frequency modulated input to an amplitude modulated output. The amplitude modulated output of the IF amplifier 140 is then fed to the data decoder 144. The data decoder 144 converts the amplitude modulated input to a serial digital output identical to the frame 300 generated by the terminal support element 24. The output of the data decoder 144 is then fed to the host support element 36.

The data received by the host support element 36 is fed to the USRT 226. The first eight bits of data are the flag 302 which indicates the start of the frame 300. The next two bytes of data are the node field 312 and the channel field 314 which the USRT 226 internally compares to the address of the host support element 36. The same comparison is made by all nodes on the channel. The USRT 178 of the terminal support element 24 will receive back the flag 302 if the transmission of the frame 300 has not collided with a transmission by another node. If the USRT 178 does not receive the flat 302 it will continue the transmission in the normal manner. However, if the USRT 178 does not receive the flag 302 it is presumed that a data collision has occurred and the USRT 178 will stop transmitting the frame 300. The USRT 178 will then send an interrupt request signal to the CPU 162. The CPU 162 will respond to the interrupt request by waiting a random time and then retransmitting the frame 300. The random backoff will assure that the terminal support element 24 does not restart transmission at the same time that the transmission from th other node is restarted.

If the node field 312 and the channel field 314 contain the address of the host support element 36 then the USRT 226 will send an interrupt request signal to the CPU 216. The CPU 216 will respond to the interrupt request by enabling the DMAC 228 which will transfer the incoming data from the USRT directly to the RAM 220. As the data is received by the USRT 226 a cyclic redundancy check value is internally computed. When the final flag 308 is received, the cyclic redundancy check value computed by the USRT 226 is compared to the cyclic redundancy check value contained in the cyclic redundancy check field 306. If a transmission error is detected the USRT 226 will output an interrupt request to the CPU 216. If no transmission error is detected the CPU 216 will read the datagram 310 from the RAM 220.

The CPU 216 will then read the control field 324 which contains the open connection request control message and the address of the terminal interface 20. If the host computer 38 has an open port the CPU 216 will assemble an open connection acknowledged data packet. The data field 326 of the return packet 320 will contain the address of the host computer interface 34 plus a port address. All future transmissions by the terminal interface 20 will contain the port address in the port field 322. The open connection acknowledged data packet will be transmitted by the host computer 38 in a manner similar to that described for the terminal interface 20.

When the open connection acknowledged control message is received by the terminal interface 20 a connection is established. Once the connection is established the terminal 26 and the host computer 38 may transmit information back and forth between each other. Each time the terminal 26 sends a data packet the sequence field 334 will be incremented and the acknowledgement field 336 will be set to the sequence number of the highest consecutively numbered data packet received from the host computer 38. Likewise, each time the host computer 38 sends a data packet the sequence field 334 will be incremented and the acknowledgement field 336 will be set to the sequence number of the highest consecutively numbered data packet received from the terminal 26.

When all communication with the host computer 38 is complete the user will type a request at the terminal 26 to close the connection. The terminal support element 20 will transmit the request to the host support element 34. The host support element 34 will send back a close connection acknowledgement to the terminal support element 20 which will terminate the connection.

Communication through the channel bridge 18 may be illustrated by the following example. A transmitting node is assigned to Channel A and a receiving node is assigned to Channel B. In order for the transmitting node to send data to the receiving node the data must be routed through the channel bridge 18. The channel bridge 18 includes one MODEM 22 set to Channel A and one MODEM 22 set to Channel B. The MODEM 22 set to Channel A feeds the incoming data to the USRT 246. The USRT 246 will see the flag 302 and then load the next two bytes into registers and compare the channel field 314 to the code for Channel A. If the channel field 314 contains the address of Channel A the USRT 246 will not send an interrupt request to the CPU 236 since the data does not need to be transferred to another channel. If the channel field 314 does not contain the address of Channel A then the USRT 246 will send an interrupt request to the CPU 236. The CPU 236 will respond to the interrupt request by enabling the DMAC 248 which will transfer the received data from the registers of the USRT 246 to the RAM 240. The USRT 246 will perform the cyclic redundancy check and send an interrupt to the CPU 236 if a transmission error is detected.

After the received data has been transferred to the RAM 240 the CPU 236 will read the channel field 314 containing the address for Channel B and then begin transferring the received data to the USRT 246 which is connected to the MODEM 22 set to Channel B. If no other transmissions are detected on Channel B the request to send signal will be sent to the MODEM 22 and the data will be transmitted onto the cable 14 on Channel B. The USRT 246 associated with Channel B will perform collision detection for the frame 300 retransmitted onto Channel B in the same manner as was done with the USRT 178 of the terminal support element 24. The receiving node will then detect and receive the data in the normal manner.

The data communication system 10 provides increased data communication capacity through the connection of channels by the channel bridge 18. Low cost of the MODEM 22 is achieved by use of the DAC 98 to produce an amplitude modulated signal which is then used to produce a frequency modulated signal for transmission thus enabling the use of less expensive filters. The programmable channel select feature is made possible by the use of two phase lock loop circuits. The overall expense of installing the data communication system 10 is reduced by the capability for use of existing CATV coaxial cable networks.

Although the present invention has been described in terms of the presently preferred embodiment, it is to be understood that such disclosure is not to be interpreted as limiting. Various alterations and modifications will no doubt become apparent to those skilled in the art after having read the above disclosure. Accordingly, it is intended tha the appended claims be interpreted as covering all alterations and modifications as fall within the true spirit and scope of the invention.

What is claimed is:

1. A data communication system comprising:
   a coaxial cable;
   a plurality of MODEM's connected to the cable including means for selecting the transmit and receive frequency bandwidths of each of the MODEM's;
   means connected to the MODEM's for supplying data to and receiving data from each of the MODEM's;
   a central retransmission facility connected at the head end of the cable whereby a signal transmitted by at least one of the MODEM's is received by the central retransmission facility and translated to the receive frequency bandwidth of the MODEM which transmitted said signal; and
   a channel bridge connected to the cable including two or more MODEM's each of said MODEM's having different transmit frequency bandwidths and different receive frequency bandwidths and including means for transferring a signal received by one of said MODEM's to another of said MODEM's whereby the MODEM's connected to the cable which are transmitting and receiving in different frequency bandwidths may receive signals from and transmit signals to each other.

2. The data communication system of claim 1, wherein;
   the coaxial cable comprises a broadband coaxial cable.

3. The data communication system of claim 1, wherein;
   the means connected to some of the MODEM's for supplying data to and receiving data from the MODEM's include means for supplying data to and receiving data from a terminal.

4. The data communication system of claim 1, wherein;
   the means connected to some of the MODEM's for supplying data to and receiving data from the MODEM's include means for supplying data to and receiving data from a plurality of terminals.

5. The data communication system of claim 1, wherein;
   the means connected to some of the MODEM's for supplying data to and receiving data from the MODEM's include means for supplying data to and receiving data from a host computer.

6. The data communication system of claim 1, wherein;
   the MODEM's include means for detecting the presence of a signal on the cable.

7. The data communication system of claim 1, wherein;
   the means connected to the MODEM's for supplying data to and receiving data from each of the MODEM's includes means for comparing a plurality of the first bits of data received to the corresponding bits of data transmitted by one of the MODEM's attempting to transmit a signal whereby data collisions may be detected.

8. The data communication system of claim 7, wherein;
   said means for comparing data are included in a universal synchronous receiver/transmitter.

9. The data communication system of claim 1, further comprising;
   encryption means coupled with the means for supplying data to and from the MODEM's whereby data transmitted over the cable is encrypted by the transmission source and decrypted by the transmission destination.

10. The data communication sytem of claim 9, wherein;
    the encryption means includes an interchangeable encryption key.

11. The data communication system of claim 10, wherein;
    said encryption key comprises an erasable programmable read only memory.

12. The data communication system of claim 1, wherein;
    said means for transferring a signal included in the channel bridge comprises a universal synchronous receiver/transmitter connected to said MODEM's, data and address buses connected to each of said universal synchronous receiver/transmitters, a central processing unit connected to said data and address buses and memory connected to said data and address buses.

13. A method of collision detection for data communication comprising the steps of:

formating digital data by a transmitting node whereby a flag is inserted at the beginning of a transmission frame;

broadcasting said transmission frame onto a cable;

receiving said transmission frame by a central transmission facility;

translating said transmission frame by said central retransmission facility to a receive frequency bandwidth;

rebroadcasting said transmission frame in said receive frequency bandwidth onto said cable;

receiving said flag of said transmission frame by said transmitting node;

comparing said flag as received to said flag as transmitted to detect a collision of data;

aborting the broadcasting of said transmission frame when a collision of data is detected;

waiting a random time after detecting a collision of data; and rebroadcasting said transmission frame after waiting a random time.

* * * * *